United States Patent
Averin (10) Patent No.: US 12,204,931 B1
(45) Date of Patent: Jan. 21, 2025

(54) SYSTEMS AND METHODS FOR PROCESS RESTORATION SUBSEQUENT TO AN OPERATING SYSTEM CRASH

(71) Applicant: Virtuozzo International GmbH, Schaffhausen (CH)

(72) Inventor: Vasily Averin, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 437 days.

(21) Appl. No.: 17/545,859

(22) Filed: Dec. 8, 2021

(51) Int. Cl.
*G06F 9/46* (2006.01)
*G06F 9/50* (2006.01)

(52) U.S. Cl.
CPC ............ *G06F 9/461* (2013.01); *G06F 9/5027* (2013.01)

(58) Field of Classification Search
CPC .............................. G06F 9/461; G06F 9/5027
See application file for complete search history.

(56) References Cited

U.S. PATENT DOCUMENTS

| | | | | |
|---|---|---|---|---|
| 2005/0256843 | A1* | 11/2005 | Santos | G06F 16/1767 |
| 2012/0159462 | A1* | 6/2012 | Leibman | G06F 11/3636 712/34 |
| 2015/0113325 | A1* | 4/2015 | Wholey, III | G06F 11/1448 714/20 |
| 2015/0317491 | A1* | 11/2015 | Yang | G06F 11/1451 726/26 |
| 2019/0370113 | A1* | 12/2019 | Zhao | G06F 9/545 |

* cited by examiner

*Primary Examiner* — Gregory A Kessler
(74) *Attorney, Agent, or Firm* — ArentFox Schiff LLP; Michael Fainberg (57) ABSTRACT

Disclosed herein are systems and method for restoring a process. An exemplary method may include detecting a crash of an operating system (OS) on a computing device; collecting a memory state of at least one page of physical memory of the OS on the computing device; generating a checkpoint file that includes information related to one or more processes from the collected memory state, wherein the information comprises a state for each of the one or more processes at a time of the crash; for each respective process of the one or more processes, creating, on the computing device or another computing device, a new process corresponding to the respective process; and restoring, based on the checkpoint file, a state of the respective process at the time of the crash such that the new process initiates execution from the restored state.

20 Claims, 7 Drawing Sheets

SYSTEMS AND METHODS FOR PROCESS RESTORATION SUBSEQUENT TO AN OPERATING SYSTEM CRASH

FIELD OF TECHNOLOGY

The present disclosure relates to the field of software execution and stability, and, more specifically, to systems and methods for restoring processes after an operating system (OS) crash.

BACKGROUND

In the typical case of an operating system (OS) crash on a computing device, only a few processes (e.g., one) are responsible for the error that caused the crash. Even so, all other processes (e.g., hundreds of them) that were running on the node cannot function any longer.

In existing implementations, subsequent to a crash, a crash dump file may be created that contains the physical memory contents of the computing device. For example, in Linux, if the "kdump" service is enabled on the node, during the node crash, the "kexec" service switches to a second kernel, which lays in a special reserved memory region and dumps the node's physical memory into a "vmcore" file. Such crash dump files are very large and typically contain only system memory used by the OS kernel.

However, the crash dump files are largely used for analyzing why the error occurred; they do not resolve the crash consequences. Because existing implementations do not restore processes or containers that stopped functioning because of an OS crash, user activity on the computing device may be lost or can be interrupted.

SUMMARY

To address this shortcoming, aspects of the disclosure describe a method, a system, and a non-transitory computer readable medium storing thereon computer executable instructions for restoring processes after an operating system (OS) crash.

In one exemplary aspect, the techniques described herein relate to a method for restoring a process, the method including: detecting a crash of an operating system (OS) on a computing device, wherein upon crash detection one or more processes running on the OS are prevented from proceeding execution; collecting a memory state of at least one page of physical memory of the OS on the computing device; generating a checkpoint file that includes information related to the one or more processes from the collected memory state, wherein the information includes a state for each of the one or more processes at a time of the crash; for each respective process of the one or more processes, creating, on the computing device or another computing device, a new process corresponding to the respective process; and restoring, based on the checkpoint file, a state of the respective process at the time of the crash such that the new process initiates execution from the restored state.

In some aspects, the techniques described herein relate to a method, wherein the information related to the one or more processes in the checkpoint file further includes contents of memory pages assigned to the one or more processes, wherein restoring the state of the respective process further includes setting contents of memory pages of the new process to be equal to contents of memory pages assigned to the respective process at the time of the crash.

In some aspects, the techniques described herein relate to a method, wherein the information related to the one or more processes in the checkpoint file further includes references to I/O resources used by the one or more processes, wherein restoring the state of the respective process further includes providing, to the new process, access to I/O resources used by the respective process on the computing device at the time of the crash.

In some aspects, the techniques described herein relate to a method, wherein the information related to the one or more processes in the checkpoint file further includes inter-process relationships between a process and any of the one or more processes running on the OS, wherein restoring the state of the respective process further includes establishing, for the new process and one or more new processes, an inter-process relationship of the respective process on the computing device at the time of the crash.

In some aspects, the techniques described herein relate to a method, wherein the information related to the one or more processes in the checkpoint file further includes at least one kernel structure related to the one or more processes, wherein restoring the state of the process further includes creation of similar kernel structures for corresponding new processes.

In some aspects, the techniques described herein relate to a method, wherein the one or more processes are included in a container and depend on each other, and wherein restoration of the one or more processes enables the container to execute on the computing device or the another computing device starting from a point when the crash occurred.

In some aspects, the techniques described herein relate to a method, wherein the computing device and the another computing device are members of a cluster of computing devices, further including: determining whether the one or more processes are to be restored on the computing device or the another computing device; and in response to determining that the one or more processes are to be restored on the computing device, creating the new process subsequent to a reboot of the computing device.

In some aspects, the techniques described herein relate to a method, wherein a determination of whether the one or more processes are to be restored on the computing device or the another computing device is made prior to generating the checkpoint file, further including: in response to determining that the one or more processes are to be restored on the another computing device, retrieving a crash dump file of the OS; generating the checkpoint file by extracting the information from the crash dump file; and transmitting the checkpoint file to a storage device shared by the computing device and the another computing device.

In some aspects, the techniques described herein relate to a method, wherein determining whether the one or more processes are to be restored on the computing device or the another computing device is based on loads of the computing device and at least the another computing device in the cluster.

In some aspects, the techniques described herein relate to a method, wherein restoration of a first subset of the one or more processes is prioritized over a second subset of the one or more processes, wherein the first subset includes processes tagged as critical.

It should be noted that the methods described above may be implemented in a system comprising a hardware processor. Alternatively, the methods may be implemented using computer executable instructions of a non-transitory computer readable medium.

In some aspects, the techniques described herein relate to a system for restoring a process, the system including: hardware processor(s) of one or more computing devices configured to: detect a crash of an operating system (OS) on a computing device, wherein upon crash detection one or more processes running on the OS are prevented from proceeding execution; collect a memory state of at least one page of physical memory of the OS on the computing device; generate a checkpoint file that includes information related to the one or more processes from the collected memory state, wherein the information includes a state for each of the one or more processes at a time of the crash; for each respective process of the one or more processes, create, on the computing device or another computing device, a new process corresponding to the respective process; and restore, based on the checkpoint file, a state of the respective process at the time of the crash such that the new process initiates execution from the restored state.

In some aspects, the techniques described herein relate to a non-transitory computer readable medium storing thereon computer executable instructions for restoring a process, including instructions for: detecting a crash of an operating system (OS) on a computing device, wherein upon crash detection one or more processes running on the OS are prevented from proceeding execution; collecting a memory state of at least one page of physical memory of the OS on the computing device; generating a checkpoint file that includes information related to the one or more processes from the collected memory state, wherein the information includes a state for each of the one or more processes at a time of the crash; for each respective process of the one or more processes, creating, on the computing device or another computing device, a new process corresponding to the respective process; and restoring, based on the checkpoint file, a state of the respective process at the time of the crash such that the new process initiates execution from the restored state.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for restoring processes after an operating system (OS) crash. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes implementations of systems and methods that restore a process or a group of processes (e.g., a container) after a crash of an OS on a computing device as if they were live migrated just before the crash. It should be noted that although live migration is mentioned here, it would not be itself effective in the event of a crash. Live migration involves freezing an alive process in its current state at a first system in order to migrate the process and resume it on another system from the same execution state. Live migration would not work when the OS kernel has critical error and when all processes at the first system are unable to function (e.g., the processes are not "alive" any longer). Moreover, live migration is typically implemented as a process itself and cannot be performed (or even started) on a crashed OS. Moreover, live migration typically uses the OS kernel to retrieve a needed process' state, but after OS crash (which typically involves an OS kernel critical error detection), the OS kernel is not able to provide information, moreover common live migration tools are unable to collect the needed information directly from the computing device memory without OS kernel assistance. Another difficulty is that a container may be a group of hundreds of processes. Even if one process does not get restored or fails, the container cannot function normally on the another system.

Figure 1A:
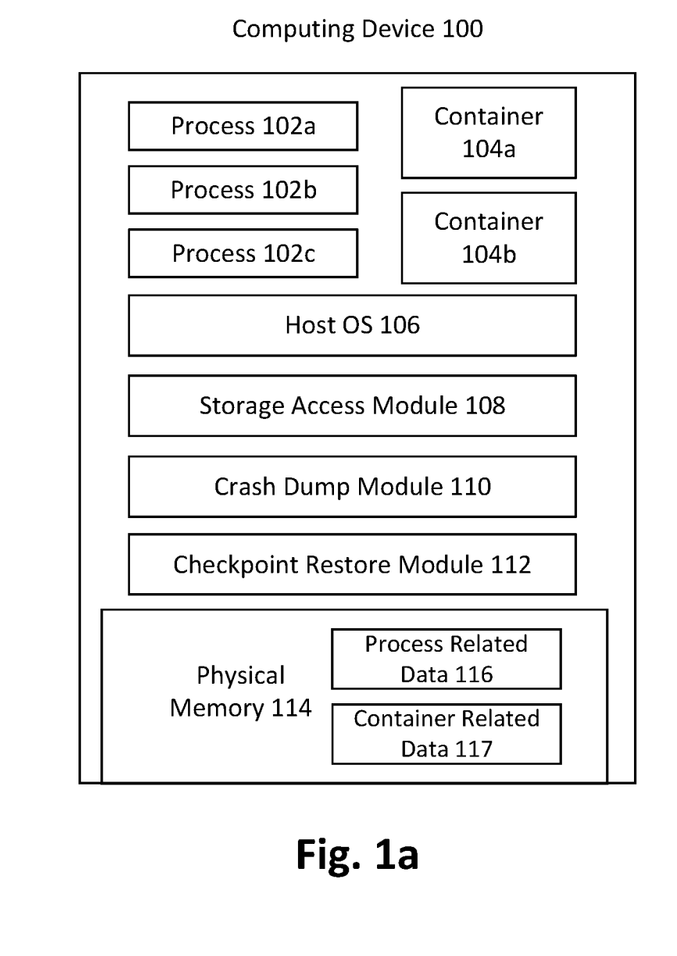
FIG. 1a is a block diagram illustrating a computing device configured to restore processes after an OS crash.
Figure 1B:
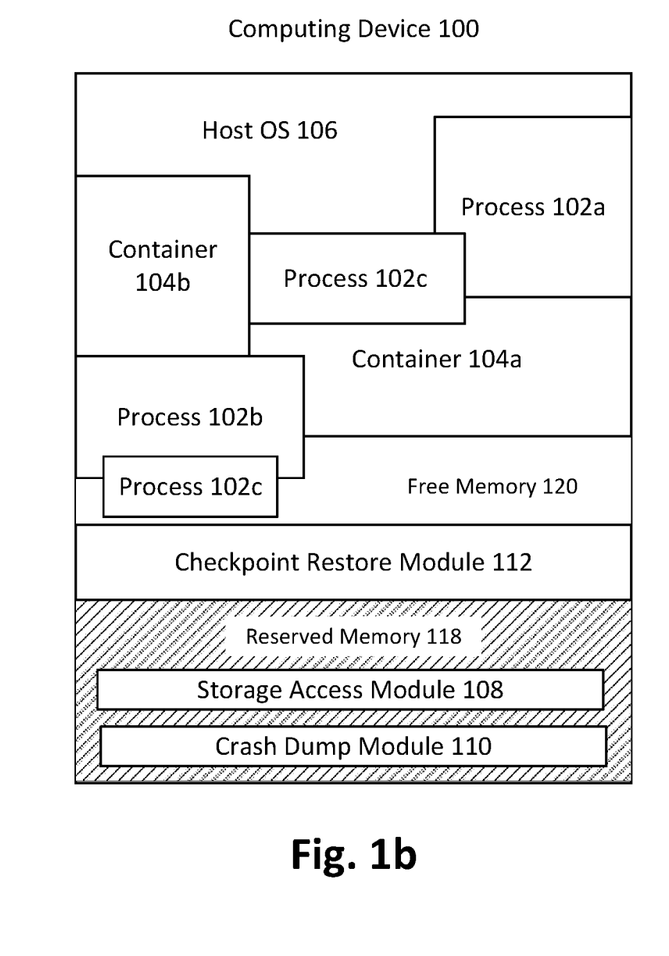
FIG. 1b is a block diagram illustrating a view of the memory in the computing device.

FIG. 1a is a block diagram illustrating computing device 100 configured to restore processes after an OS crash. FIG. 1b is a block diagram illustrating a view of the memory in computing device 100.

As shown in FIGS. 1a and 1b, computing device 100 can run process 102a, process 102b, process 102c, container 104a, and container 104b on host OS 106 (e.g., Windows, Linux, Unix, Android, Solaris, MacOS, FreeBSD, etc.). The number of processes and containers is limited on the figure for simplicity and one skilled in the art will appreciate that computing device 100 may run any number of processes and/or containers. Processes may be parts of containers. Applications, services, management tools, and/or any kind of programs may run in processes and/or in groups of processes. Computing device 100 includes physical memory 114, which stores process related data 116 for processes 102a-c and container related data 117 for containers 104a-b. In order to execute the restoration of a process and/or container, computing device 100 utilizes storage access module 108, crash dump module 110, analyze module (not shown, used in some aspects, e.g., as part of other modules and/or independently, etc.) and checkpoint restore module 112.

In FIG. 1b, these same components are present and are shown relative to their location in the memory of computing device 100. More specifically, storage access module 108 and crash dump module 110 are stored in reserved memory 118 and are started after crash detection. The remaining elements described in FIG. 1a are stored in the remaining unreserved memory and are started when the OS is working normally. The portion of the unreserved memory that is not utilized is free memory 120. It should be noted that, generally, the processes and containers are using not sequential memory regions. For example, a portion of process 102c is stored in one portion of the memory and another portion of process 102c is stored in another portion of the memory. Because of this lack of uniformity, the portions of memory shall be analyzed (and in some aspects, scanned) in order to find any given process or container. Otherwise, information about a process or container may be missed.

Crash dump module 110 works in case of a crash and is configured to collect information about physical memory state (in one aspect, it is done including not only the crashed computing device physical memory, but also the swap file). This information may be different depending on the scenario. For example, crash dump module 110 may collect an entire node's memory or only portions needed for successful restoration of a container or a process.

Figure 2:
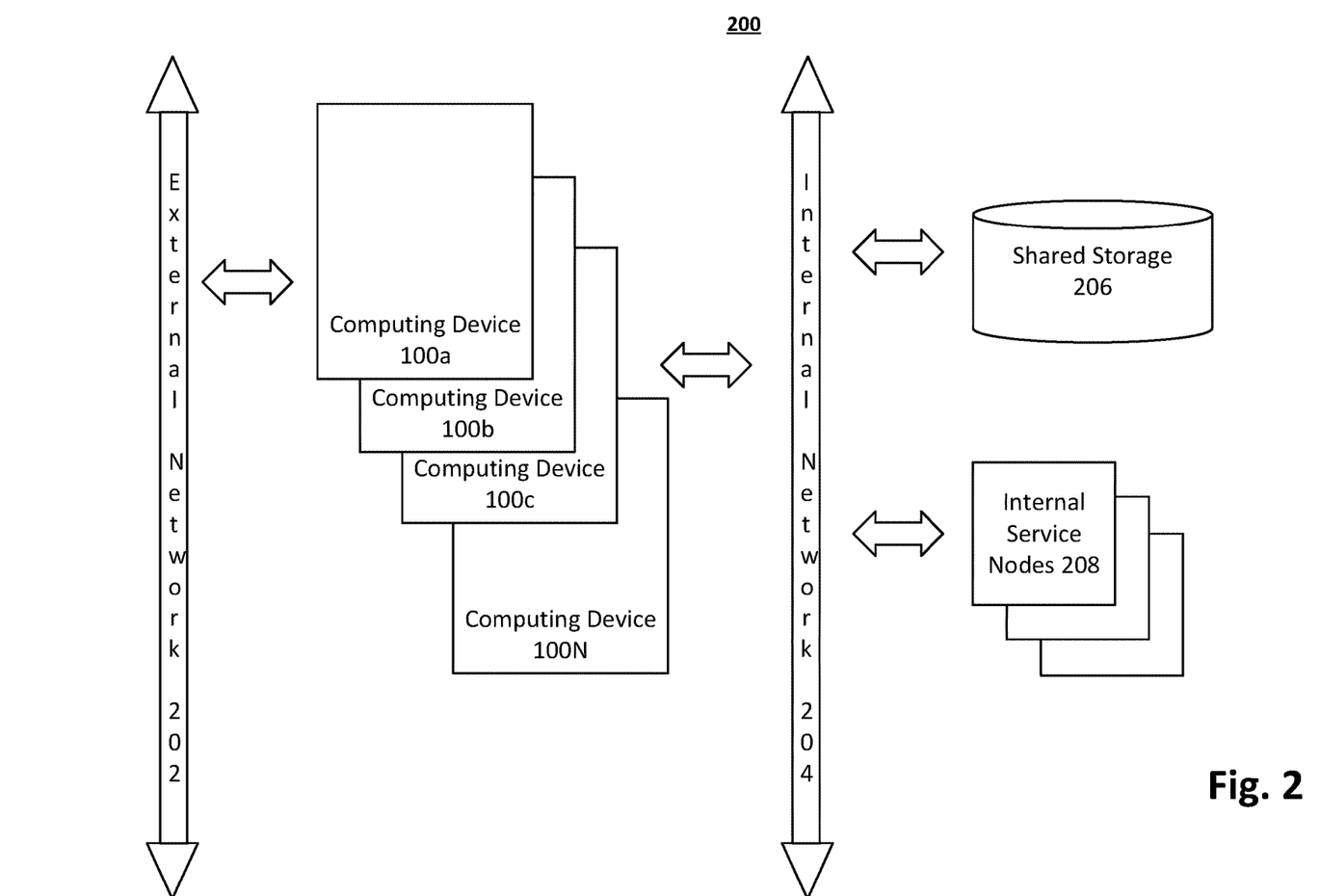
FIG. 2 is a block diagram illustrating a cluster of computing devices.

Storage access module 108 resides in reserved memory 118 and is configured to save information collected by crash dump module 110 (e.g., in a local disk or in a shared storage connected to the computing device via a network-see shared storage 206 in FIG. 2, etc.).

When a crash is detected (e.g., a OS kernel panic or a system crash), all running processes 102a, 102b, and 102c on host OS 106 are prevented from to proceeding execution, but their states just before stopping execution remain in physical memory 114 of computing device 100.

Crash dump module 110 may start after detection of an OS crash. For example, suppose the OS kernel (e.g., "first" kernel) has crashed. The computing node immediately boots into a "second" kernel (e.g., a dump-capture kernel) that is in reserved memory 118. In some aspects, the second kernel comprises the crash dump module 110 or is a part of the crash dump module 110, or the crash dump module 110 runs on top of the second kernel. In some aspects, module 110 and/or module 112 may boot over the second kernel while avoiding execution of a bootloader and hardware initialization (e.g., performed by BIOS). The second kernel and/or crash dump module 110 may access physical memory 114.

Physical memory 114, in general, stores information about running processes. Crash dump module 110 on computing device 100 may retrieve, from physical memory 114, process related data 116 (at least a part related to a process or a set of processes that shall be restored), which includes information about the state of a process(es) (e.g., process 102a) at a time of the OS crash detection, and/or container(s) related data 117 (at least a part related to a container that shall be restored).

In some aspects, process-related data 116 may additionally comprise: process' memory contents, contents of the I/O disk operations or I/O file operations not yet synchronized to the disk, and OS kernel objects (i.e., special in-memory structures containing different information used by the OS to manage the processes and OS resources) which can show: which resources the process used (e.g., file system, open and memory mapped files, sockets, pipes, other communication channels, network connections, etc.), which other processes it communicated with, the relationship between processes (e.g., parent-child relationship, etc.), etc.

Based on the retrieved information comprising the states, checkpoint restore module 112 restores the process and/or container after computing device 100 is rebooted. In the context of the present disclosure, restoration refers to the process (and the program that was running in the process) continuing execution from the point where the process was when the crash was detected rather than from the beginning. For example, the process may continue execution on the same computing device after a reboot of that computing device (or on another computing device (described in FIG. 3)) as if there was no crash.

In one aspect, checkpoint restore module 112, crash dump module or analyzing module (described below) generates a checkpoint file based on process-related data 116 and/or container related data 117 and the checkpoint file is used to restore processes.

In one aspect, the checkpoint file may have the same inner structure as is used during usual checkpoint restoration of alive processes. Checkpoint restore module 112, which is used for restoring process state (e.g., checkpoint restore in user space (CRIU) or any other process live migration tool), then restores the process (e.g., process 102a-c) using at least the process state from the checkpoint file. Using this method, one or more processes that were killed (i.e., the word "killed" is used here to show that it is impossible to execute the processes any longer, though the usual normal procedure of killing processes were not performed by the OS kernel of the crashed OS) may be restored.

In one aspect, some processes (or containers) are not restored and are restarted (e.g., in their default initial state) instead. These processes may include certain system processes, threads, management services and any of those processes that can be restarted fast (e.g., time that possibly will be needed to restore the process or a group of processes from the beginning or is within a predefined threshold to is comparable (e.g., both times are of the same order of magnitude, or their ratio is within a predefined threshold, etc.) to the time needed to perform analysis, retrieving all needed information and restoring) and/or do not contain user data.

At the time of a crash, a single process may have caused an OS error (e.g., caused the blue-screen-of-death in Windows, or kernel panic in Linux, etc.). Due to the binary nature of computers, only a single process is in fact being executed on a processor core at any given time. These, in one aspect, are not restored but restarted. Typically remaining processes are kept in an "interruptible sleep state." Thus, the states of these processes at the time of a crash can be reinstated/restored at a later time for normal operation. In one aspect, the process that caused the crash may be restarted (instead of restored at the same state). This prevents another OS crash because the failed OS processes (i.e., the processes that caused the error) are not restarted from the same state that led to failure.

In one aspect, a preparation step is needed, in which crash behavior is set up (e.g., whether to collect needed information after crash before reboot), important processes, threads, groups of processes, containers, etc. are marked (e.g., in a container configuration file, or in in-kernel container-specific structure, etc.) to make it easier to understand data which processes shall be collected, and containers and/or processes are set up (e.g., by marking them or their memory, storing more information about them, regulating which system calls they are using, etc.).

In one aspect, setting up a computing device's behavior in the event of a crash may also involve tagging some processes or containers as important (or having high priority), so that retrieving information about those processes is prioritized over the un-tagged processes.

In one aspect, if a process is bounded (e.g., communicates, is related to, etc.) to other processes (e.g., its child or parent process, etc.), both the process and the other processes are restored together regardless of priority. If the process is isolated, then it may be restored separately by checkpoint restore module 112. The checkpoint file may indicate the order of restoration.

Up until now, the present disclosure has focused on processes. However, the restoration process described above is applicable to containers as well. A container (e.g., including OS containers, stateless containers, or execution containers) is an isolated environment (e.g., a type of virtual execution environment) that supports program code execution. In some aspects, isolation of containers (e.g., containers 104a-b) is implemented on the namespace level. In some aspects, a container is defined as a group of processes isolated from other processes running on the computing device. In some aspects, containers running on the same computing device, share the OS kernel of the computing device and at least some of the system resources. In some aspects, multiple sets of applications or services are organized on a single hardware system by placing them into isolated containers. In some aspects, from the point of view of the user, the code in a virtual execution environment (VEE) runs as if it were running on the real computing system. In one aspect, at least a part of the real hardware or software utilized for running program code are presented as their virtual analogs in containers.

In an exemplary aspect, a running container has an isolated group of interacting processes. To restore a container, the method includes restoring, using container related data, the states of each of the processes of the container and establishing inter-process relationships (e.g., threads, parent-child relationships, belongings to a namespace, belongings to a control group, shared memory mappings, communication channels, any means by which processes interact with each other, etc.). This is performed in the same manner described above (i.e., using a checkpoint file (or a set of files)).

In different aspects, a previously selected container, a set of containers, or all containers (including those that failed) may be restored on the crashed computing device (i.e., after reboot) using checkpoint restoration module 112. In one aspect, previously running user containers (e.g., containers 104a-b) are restored on either computing device 100 after a reboot of computing device 100 or on another node (e.g., even before the reboot of the crashed node).

In one aspect, if the container restore fails, the container is restarted. For example, restore may fail in case where not enough information about a process or a container has been retrieved; when process's pages in memory have been corrupted during OS crash; when a new process on target device (i.e., a device where the process or container shall be restored) corresponding to the original process cannot be created in the same state as the original process has before OS crash; when the newly created "restored" process gets and error and is killed within a predefined time after restore; or etc. In one aspect, in some cases, a process/container may be restarted, if time spent on analysis and restore exceeded the network connection timeouts; though, in some cases, only network connection may be reestablished instead of restarting the whole process.

In different aspects, creation of the checkpoint file may be performed on the crashed node just after the crash, before a node reboot, after a node reboot, or on another node having access to a crash dump file, container configuration file, and/or container file system associated with the crashed OS.

In different aspects, retrieving process-related data 116 may be performed by analyzing module (e.g., which may be independent module, part of checkpoint restore module 112, part of crash dump module 110, etc.) on: crashed computing device 100 itself either before or after the reboot, another node (e.g., management computing device 318 described in FIG. 3) if the another node has access to the memory state (e.g., if it receives the information via a network, or has access to a crash dump file on shared storage, etc.), and/or several nodes (e.g., computing devices 100b and 100c described in FIG. 3) in a cluster, where each of the several nodes analyzes a separate set of processes and/or containers of the crashed node. The nodes in the cluster may be selected by a load balancer (e.g., cluster load balancer module 322 described in FIG. 3).

FIG. 2 is a block diagram illustrating cluster 200 of computing devices. Computing device 100 in FIG. 1a is depicted as computing device 100a in FIG. 2. Computing devices 100a, 100b, 100c, . . . 100N, are all members of cluster 200. They may be connected together by internal network and may have access to external network 202 (e.g., the Internet). Through internal network 204, each of the computing devices 100a-N are able to access shared storage 206 and, in some optional aspects, internal service nodes 208.

It shall be noted that any of the modules mentioned in the description can work on any device in the cluster of computing devices, be distributed among them, or etc. In some aspects, not all modules are present. In some aspects, devices can be unified or can have different specification.

Figure 3:
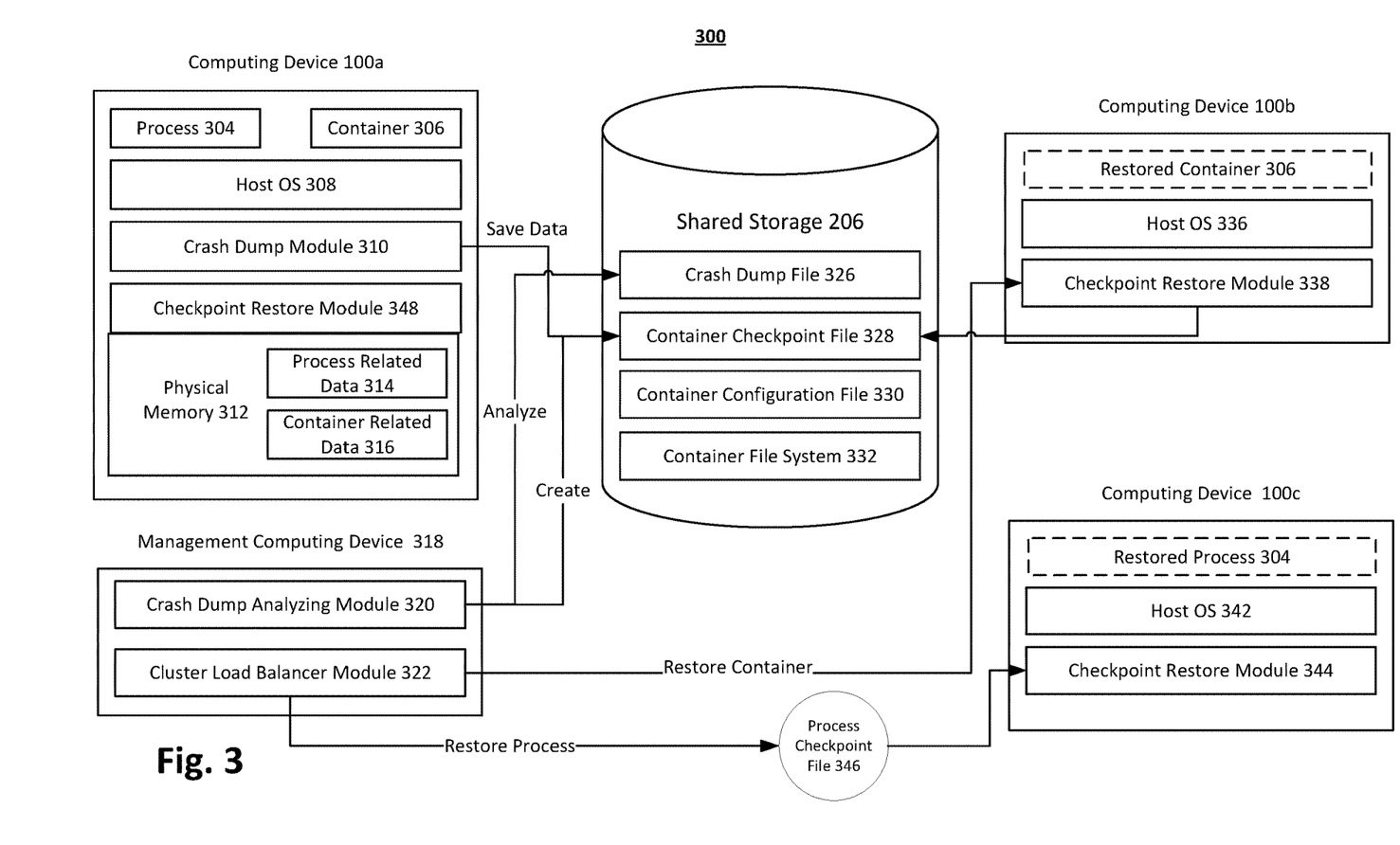
FIG. 3 is a block diagram illustrating a system for restoring processes and containers on different computing devices in a cluster.

Up until now, the description of process and container restoration has been given through the perspective of the crashed computing device. For example, if an OS crash has occurred, the processes and containers, which were running on the OS, are restored on the same computing device after it has rebooted. System 300 presents an example where the restoration is performed on different computing devices in the same cluster.

In one aspect, the collected data about processes that are stored in checkpoint files and other files (e.g., used I/O resources, configuration files, whole file system, overlay file, or image of block device, etc.) of a restored process (or whole container) can be moved to another computing device where the restoration takes place. In some aspects, after the process has been restored on the another computing device (e.g., computing device 100c), the process may be live migrated back to the original computing device (e.g., computing device 100a) upon a reboot of the original computing device. In one aspect, this saves time as the process can be immediately restored even before the original computing device is rebooted. In one aspect, the data collected on the crashed computing device is sent to another computing device and the processes are restored there even before the completion of the memory dump on the crashed computing device.

FIG. 3 is a block diagram illustrating system 300 for restoring processes and containers using a shared storage of in cluster 200. In system 300, a simplified view of each computing device is shown. It should be noted, however, that each of the computing devices may have all of the modules shown in FIG. 1a and FIG. 3.

In some implementations of system 300, crash dump module 310 may include crash dump analyzing module 320 and/or a checkpoint restore module (specifically the functionality related to creating checkpoint files in a specific format). As discussed previously, a checkpoint restore module such as module 348 is configured to restore any process or container from a checkpoint (e.g., like a live migration tool). Checkpoint restore module 348 may further restore containers or processes on the crashed node itself after a reboot.

In some aspects, rather than generating a checkpoint file directly from the contents extracted from physical memory of a crashed computing device (e.g., extracting process related data 314 and container related data 316 from physical memory 312 after the crash of host OS 308, which caused stopping execution of process 304 and container 306 on computing device 100a), an analyzing module (e.g., part of a checkpoint restore module) may rely on a crash dump file to generate the checkpoint file. In an optional aspect, crash dump module 310 may create a crash dump file if the analysis will not be performed in place and will be performed later (e.g., by another node or after a reboot of the computing device). Crash dump module 310 may be a kdump kernel that is configured to save at least a part of the crashed node's memory into the crash dump file. The determination of when and where the analysis will be performed is dependent on user preferences or on a cluster's or device's crash behavior settings.

A checkpoint restore module subsequently extracts process-related data 314 and/or container related data 316 from the crash dump file (e.g., a file in format alike to "vmcore" file in case of Linux). In some aspects, the extracted process related and/or container related data is saved by crash dump module 310 in the crash dump file, and then used by analyzing module to create a checkpoint file in a format for storing process state used during live migration of processes. In one aspect, a checkpoint file can be created during the dump of the host memory along with or instead of creating a crash dump file. For example, a crash dump module can save not only one crash dump (e.g., in a vmcore format) file, but save checkpoint (e.g., in a CRIU format) files for the selected processes as well.

In one aspect, during the analysis of memory contents (either in a crashed computing device's physical memory or in a crash dump file), an analyzing module (which can be a part of a checkpoint restore module or a crash dump module) finds a memory region assigned to the process and at least one kernel structure mentioning the process. The module then retrieves the information required for restoration using links to other kernel structures. OS kernel structures may, for example, store list of processes (e.g., task list), memory maps of processes/threads (memory map structure; e.g., describing which memory pages are used). These structures have references to other structures, and by looking through the structures related to a process the analyzing module is able to retrieve needed information about the process, for example, including a memory region assigned to the process, inter-process relations, etc.

In one aspect, instead of collecting the whole physical memory, crash dump module 110 simply collects data related to a selected process (or a group of processes). For example, the crash dump module 310 (e.g., modified kdump kernel) may not create a full crash dump file, but may instead (or along with it) create checkpoint restore file(s) for corresponding processes or groups of processes.

In FIG. 3, crash dump module 310 saves crash dump file 326 in shared storage 206.

In one aspect, a shared storage may be a network file system or a distributed storage.

In one aspect, there also is a management computing device 318, which may be a computing device similar to the one shown in FIG. 1a, or may be a dedicated device, that analyzes crash dump files, generates checkpoint files, and determines where in cluster 200 the restoration should take place.

In one aspect, crash dump analyzing module 320 generates checkpoint files based on crash dump files. In system 300, crash dump analyzing module 320 analyzes crash dump file 326, which includes crashed computing device memory contents (e.g., at least process related data 314 and/or container related data 316), and generates, for example, container checkpoint file (or set of files) 328 and/or process checkpoint file (or set of files) 346.

In general, crash dump analyzing module 320 is responsible for retrieving specific information related to a particular container or process. Module 320 may reside anywhere in the cluster: on any node (even on the crashed one) or may be distributed among the nodes. For example, module 320 may be a part of crash dump module 110 (and therefore reside on the crashed node inside of the reserved memory 118, and this case, crash dump module 310 does not simply collect and save whole memory contents, but also analyzes (at least performs some checks, e.g., whether kernel structures are not corrupted and contain needed information, or whether process' memory pages are corrupted, or whether the process possibly can be restored, etc.) the information in place (e.g., creates at least one checkpoint file related to at least one process). In another example, module 320 may reside on the crashed node outside of reserved memory 118 if after reboot the crashed node will be used for analyzing (and possibly restoring) any processes.

In one aspect, each process and/or container may have its own unique checkpoint file (or even a set of files). In another aspect, several processes and/or containers checkpoint data may be stored in a single checkpoint file. In yet another aspect, cluster load balancer module 322 determines which and where each process and/or container is to be restored and generates a checkpoint file with the relevant process and container information for each computing device where restoration will occur. Details on the contents of container checkpoint file 328 are explained in FIGS. 4 and 5.

In one aspect, configuration files of the container, checkpoint files of the processes to be restored, crash dump files of crashed computing nodes, etc. are stored on a shared storage device (e.g., shared storage 206), and are thus accessible by the devices in the cluster. In one aspect, a file system used by the processes and/or containers is located on the shared storage device as well. Thus, the processes and/or containers can be restored on another computing device (or on multiple computing devices in a cluster) without moving the file system.

In one aspect, for example, the cluster (e.g., by management computing device 318) may store container checkpoint file 328 in shared storage 206, which also includes container configuration file 330 and container file system 332. In some aspects, configuration file 330 and container file system 332 are regularly synchronized based on usage of container 306 at computing device 100a.

In one aspect, checkpoint restore module 338 on computing device 100b with host OS 336 may restore container 306 using container checkpoint file 328 (e.g., retrieved from shared storage 206 as shown on the figure). Likewise, checkpoint restore module 344 on computing device 100c with host OS 342 may restore process 304 using process checkpoint file 346 (e.g., sent directly from management computing device 318 as shown on the figure; or taken from shared storage; or created by analyzing module in some other aspects, etc.).

In one aspect, restoring includes sending a notification (e.g., by a crashed computing device, by a load balancer, etc.) to another node with a compatible kernel to restore the process.

In one aspect, each action such as collecting physical memory contents (e.g., to create a crash dump file), analyzing a crash dump to obtain process-related data, and restoring the process may be performed on different nodes in the cluster.

In one aspect, cluster load balancer module 322 may determine that computing device 100a has crashed and may assign other nodes to analyze the crash dump file or restore processes. For example, cluster load balancer module 322 assigns the restoration of container 306 to computing device 100b and the restoration of process 304 to computing device 100c.

In one aspect, during selection of another cluster node for restoration of the processes and/or container, cluster load balancer module 322 takes the current load of cluster nodes into account.

In one aspect, processes/containers have different priorities. According to the priorities checkpoint files are created for the processes/containers at different times and/or at different devices (e.g., a checkpoint file for a process with the highest priority may be created first (e.g., even before reboot of the crashed node (e.g., by 310, or by 320), or even before end of collecting the crash dump, etc.)). As soon as a checkpoint file for a process/container is ready, the load balancer decides where and how the corresponding process/container shall be restored.

In one aspect, restoring of a process(es) with higher priority is performed in parallel with analysis of a process(es) lower priority.

In one aspect, if the neighboring nodes do not have enough resources to run any additional containers/processes, cluster load balancer module 322 may ask to stop/freeze some low-priority containers and start high-priority containers on the crashed host.

In one aspect, another computing node (e.g., computing device 100c) is selected for restoration and the another computing device has a compatible kernel or may restore the process in a virtual machine.

In one aspect, a module responsible for on-site crash behavior (e.g., kexec handler) can connect to checkpoint restore module (e.g., CRIU-restore machinery) on neighboring nodes and restore processes/containers, even without saving any checkpoint files. In one aspect, the checkpoint restore module, during restore (e.g., even after a process creation step), sends requests to the on-site module when a portion of information is needed (e.g., memory page contents).

In one aspect, during the restoration, the method prevents network connections from being lost because the time spent on analyzing and restoring is less than network connection downtime. This may be achieved, for example, by not saving all physical memory contents, and only saving container-related data 316 and/or process-related data 314 (e.g., process memory, relationships and settings) or by performing analysis in parallel by several computing devices.

Figure 4:
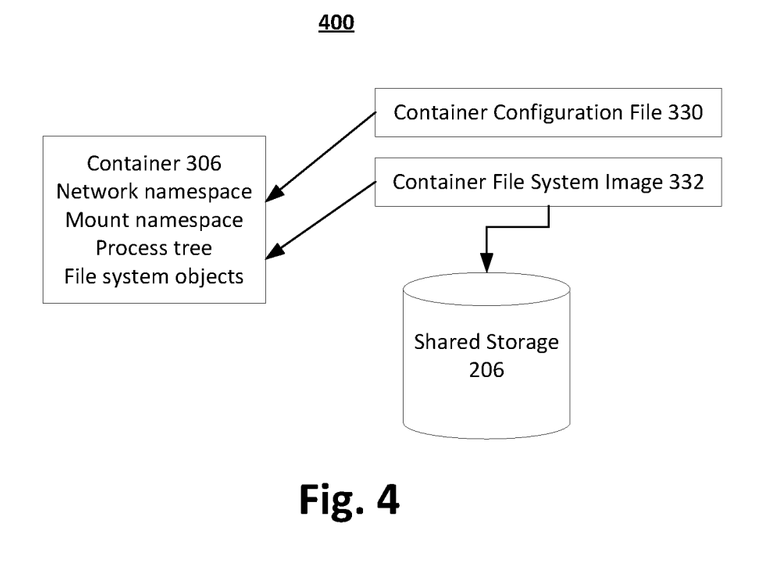
FIG. 4 is a block diagram illustrating the information related to a container.

FIG. 4 depicts block diagram 400 illustrating the information related to a container and needed for restoration. The needed files can be stored in a shared storage 206, or on a network storage, or on a computing device's local disk, or etc.

In block diagram 400, container configuration file 330 and container file system image 332 may be stored in shared storage 206 or in a local disk of the crashed computing device. The checkpoint file contains information about the network namespace, mount namespace, process tree, and file system objects of container 306, and may be put on shared storage 206 (e.g., in an aspect, where a cluster of computer devices comprises a shared storage), on the local disk of the crashed computing device (e.g., if the restore will be performed on the same crashed computing device), sent to another computing device (e.g., via network; e.g., if the restore will be performed on that "another" computing device), etc. It should be noted that a configuration file represents information about a stopped container (e.g., resource limits (e.g., number of CPU, max memory usage), host name, priorities, network addresses, features allowed for using inside of the container (e.g., NFS server, client, direct access to node device), settings, etc.). In contrast, a checkpoint file includes information about the state of execution of a container at a specific time.

In one aspect, information from a crashed computing device's physical memory is not enough and some files from the crashed node disk are also needed such as the file system, a block device file, a configuration file of a container, a file that was opened or memory mapped by the process at the time of crash, etc. In one aspect, this information is also stored on shared storage 206.

Figure 5:
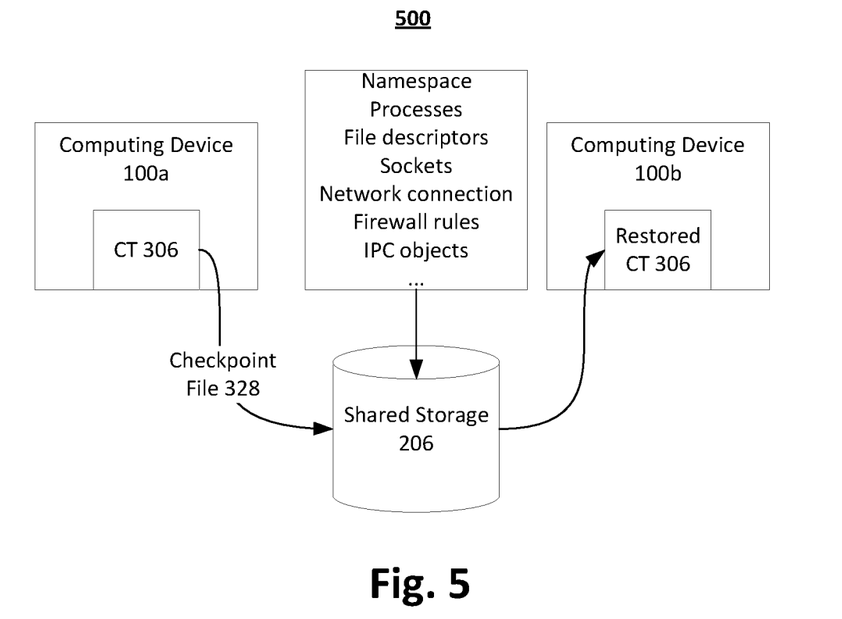
FIG. 5 is a block diagram illustrating a restoration of a container using the shared storage.

FIG. 5 depicts block diagram 500 illustrating a restoration of container 306 using the shared storage 206. In block diagram 500, a checkpoint file 328 (e.g., a file or a set of files describing container state) is transmitted to shared storage 206 from computing device 100a. In one aspect, checkpoint file 328 may be created by the crash dump module that starts after the crash is detected on the computing device 100a and when the crash dump module collects information related to a particular container from the computing device 100a physical memory. In another aspect, the checkpoint file 328 may be created and transmitted to the shared storage by an analyzing module using the crash dump file created by the crash dump module that starts after the crash is detected on the computing device 100a and collects all needed information from the computing device 100a physical memory. In one aspect, the crash dump module or analyzing module may retrieve some information from swap file.

The information in checkpoint file 328 includes namespace, processes, file descriptors, sockets, network connections, firewall rules, IPC objects, etc. Using this information, a checkpoint restore module on computing device 100b is able to restore container 306 in the same state at which it was when host OS of the computing device 100a stopped functioning.

After restoration by a checkpoint restore module, a process and/or container has access to the same I/O resources that it had on the crashed node before crash. For example, such resources can be a file system, a block device, network sockets, inter-process communication channels, etc. During restoration, such I/O resources may be recreated on computing device 100a or created on a different computing device 100b where restore is performed, or at least the access to them may be provided to the process being restored. In one aspect, all needed files are opened (i.e., made available).

Figure 6:
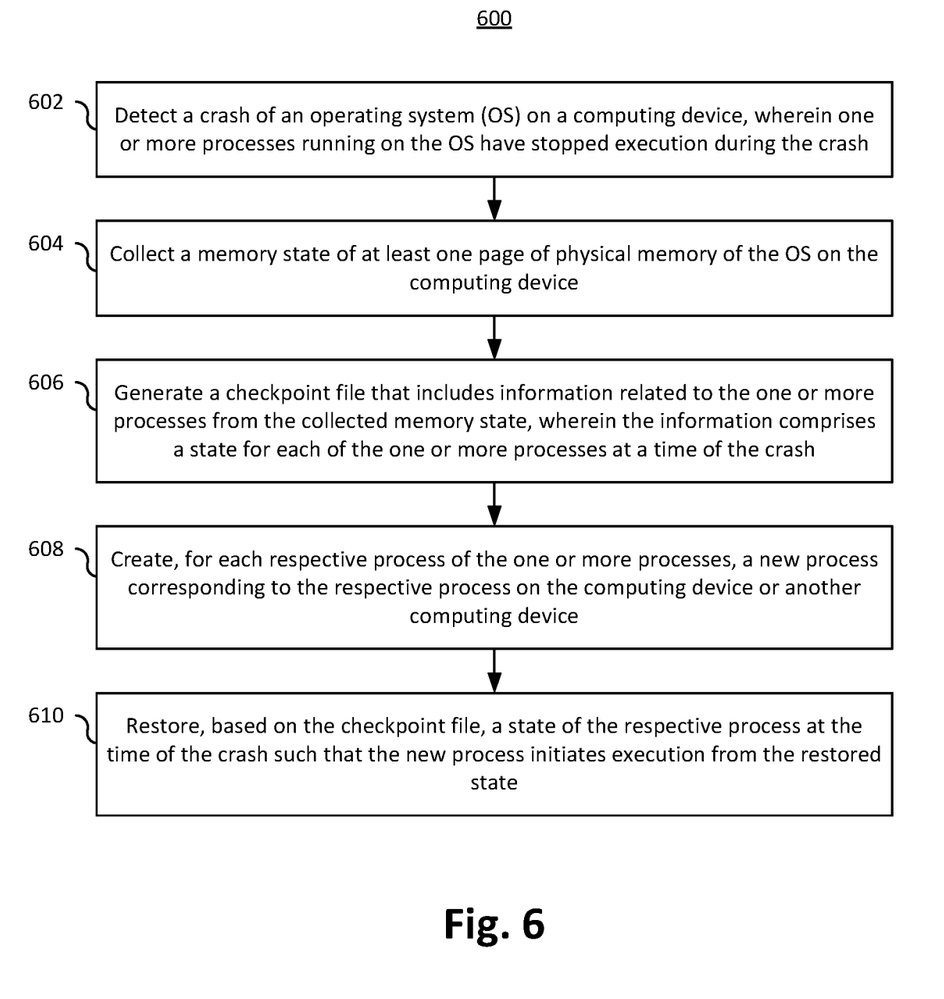
FIG. 6 illustrates a flow diagram of a method for restoring a process after an OS crash.

FIG. 6 illustrates a flow diagram of method 600 for restoring a process after an OS crash. At 602, a crash of an operating system (OS) on a computing device is detected, wherein execution of one or more processes running on the OS is stopped in response to the crash detection. For example, in FIG. 3, host OS 308 kernel detects a crash of host OS 308 on computing device 100a, stops execution of processes (the processes are not killed as usual, but are unable to proceed with execution, to be scheduled, etc.) and transfers control to crash dump module 310 (which in turn may comprise or be a part of an another OS kernel stored in the reserved portion of physical memory of the computing device), wherein process 304 and container 306 have been running on the computing device on the OS just before the crash (e.g., when the crash occurred, or when the crash was detected, etc.) and also, cannot be executed any longer on the computing device as they are a part of the crashed OS.

At 604, the method 600 (e.g., by the crash dump module 310, or by crash dump analyzing module 320, etc.) collects a memory state of at least one page of physical memory of the OS on the computing device. For example, the crash dump module 310 may retrieve the memory state of at least one page of physical memory of the OS on the computing device from the physical memory of the OS on the computing device and put it in a crash dump file 326 (e.g., for further analysis by crash dump analyzing module 320) or can perform the analyze in place and put the state directly in a checkpoint file. In one aspect, for example, crash dump analyzing module 320 may retrieve the memory state from crash dump file 326 (e.g., stored in shared storage 206).

At 606, the method 600 (e.g., by crash dump analyzing module 320, or by checkpoint restore module, or by crash dump module 310, etc.) generates a checkpoint file (or files) that includes information related to the one or more processes from the collected memory state, wherein the information comprises a state for each of the one or more processes at a time of the crash. For example, crash dump analyzing module 320 may generate container checkpoint file 328 and/or process checkpoint file 346.

At 608, the method 600 (e.g., by a checkpoint restore module) creates, based on the checkpoint file(s), on the computing device or another computing device, for each respective process of the one or more processes, a new process corresponding to the respective process. For example, checkpoint restore module 338 creates restored container 306 on computing device 100b and checkpoint restore module 344 creates restored process 304 on computing device 100c. For example, computing device 100a may be rebooted and checkpoint restore module 348 running on it after reboot may create a restored process and/or container (e.g., group of processes).

At 610, the checkpoint restore module restores, based on the checkpoint file, a state of the respective process at the time of the crash such that the new process initiates execution from the restored state. For example, restored container 306 and restored process 304 may run on their respective computing devices starting from the last known state they had on computing device 100a before OS crash.

Figure 7:
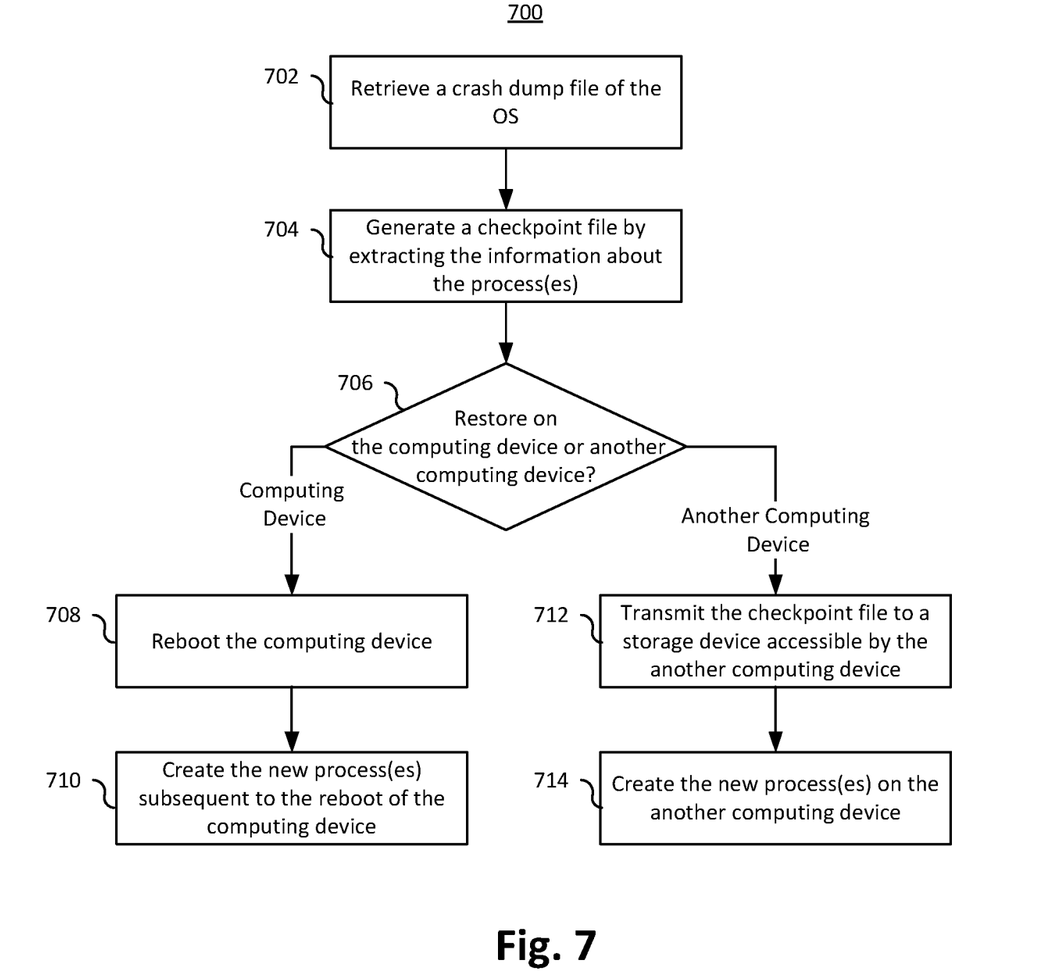
FIG. 7 illustrates a flow diagram of a method for determining where and how to perform the restoration.

FIG. 7 illustrates a flow diagram of method 700 for determining where and how to perform the restoration. The steps of the method may be performed at least partially on the crashed computing device, and/or on the another computing device, and/or on a third (e.g., management) computing device, etc. While the various actions in the methods are discussed in a particular order, it is to be appreciated that the actions can be performed in different orders than those depicted and at least some of the actions may be performed concurrently with one another.

At 702, the method retrieves a crash dump file of the crashed OS of the computing device. For example, in FIG. 3, the crash dump module 310 creates crash dump file 326 by retrieving information from the computing device, and/or crash dump analyzing module 320 retrieves crash dump file 326 from shared storage 206. In one aspect, this step is not performed (e.g., a checkpoint file is generated directly from the information taken from the crashed computing device physical memory), and the method starts from step 704.

At 704, the method generates the checkpoint file by extracting the information related to the process (or a set of processes, e.g., a container), for example, from the crash dump file or, in another example, from the crashed computing device physical memory. For example, crash dump analyzing module 320 generates container checkpoint file 328 and process checkpoint file 346 based on crash dump file 326.

At 706, the method 700 may determine whether to restore a process/container on the computing device that crashed or on a different computing device. In response to determining that the process/container is to be restored on the crashed computing device itself, method 700 advances to 708 and 710, where method 700 (e.g., by the checkpoint restore module) creates (e.g., using the information from the checkpoint file) the new process(es) having the required state, I/O resources and/or file system subsequent to a reboot of the crashed computing device. In some aspects, the reboot of the crashed computing device 708 may be performed at any time before 710 (e.g., between 706 and 710, between 702 and 704, or between 704 and 706, or even in parallel any other steps of the method depending on the aspect, etc.).

In response to determining that the process/container is to be created on a different computing device (e.g., connected to the crashed computing device in a cluster), method 700 advances to 712.

At 712, the method 700 transmits the checkpoint file to a storage device accessible to the different computing device (e.g., a storage device shared by the computing device and the different computing device; or sends the checkpoint file to the different computing device). For example, crash dump analyzing module 320 transmits container checkpoint file 328 to shared storage 206. Then method 700 advances to 714, where method 700 (e.g., by the checkpoint restore module) creates (e.g., using the information from the checkpoint file) the new process(es) having the required state, I/O resources and/or file system on the different computing device.

Figure 8:
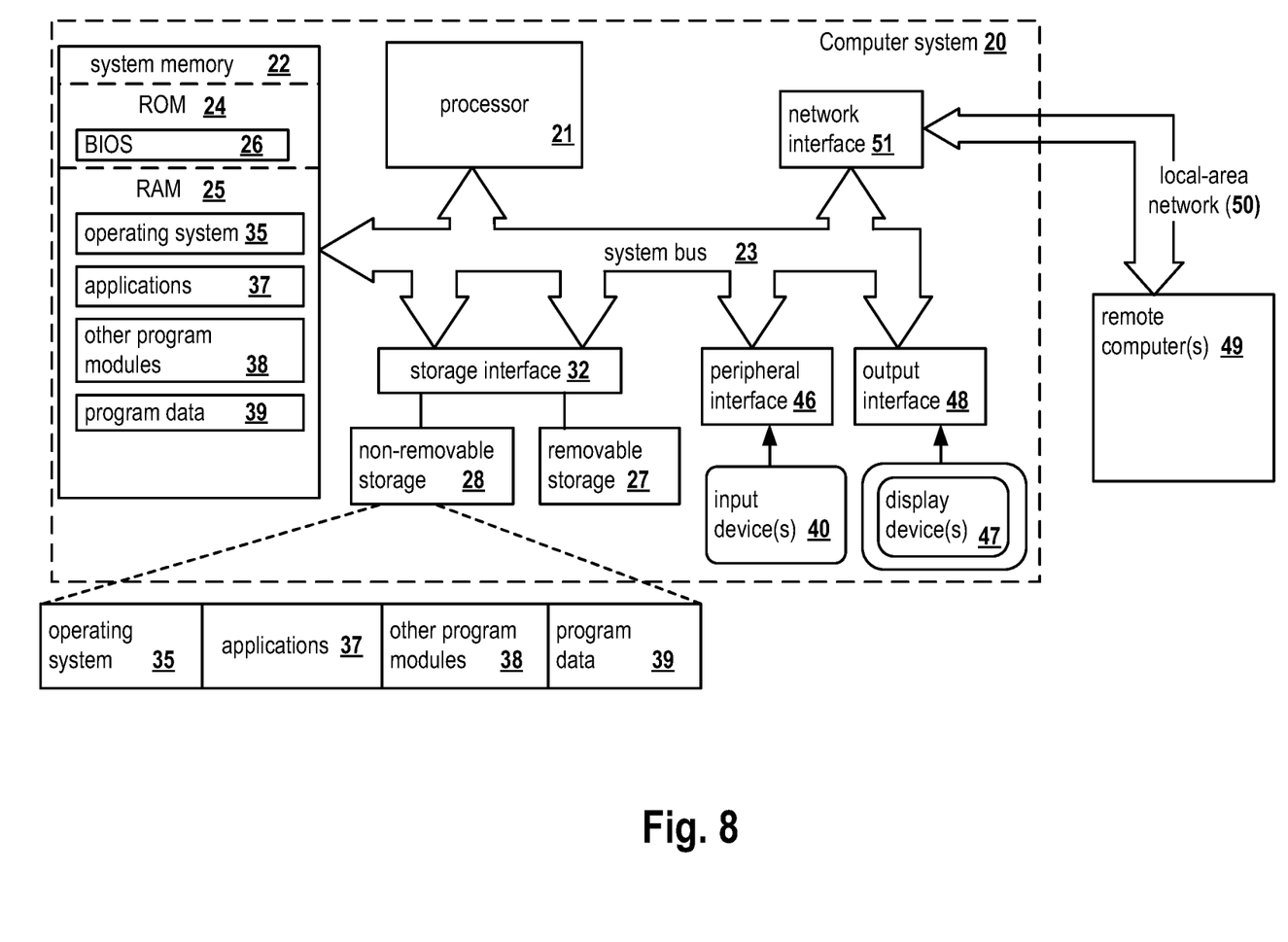
FIG. 8 presents an example of a general-purpose computer system on which aspects of the present disclosure can be implemented.

FIG. 8 is a block diagram illustrating a computer system 20 on which aspects of systems and methods for restoring processes after an OS crash may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for restoring a process, the method comprising:
　　detecting a crash of an operating system (OS) on a computing device, wherein upon crash detection one or more processes running on the OS are prevented from proceeding execution;
　　collecting, from an OS crash dump on a subsequent boot, a memory state of at least one page of physical memory of the OS on the computing device;
　　generating, without using information from a currently running OS kernel, a checkpoint file that includes information related to the one or more processes from the collected memory state, wherein the information comprises a state for each of the one or more processes at a time of the crash;
　　for each respective process of the one or more processes, creating, on the computing device or another computing device, a new process corresponding to the respective process; and
　　restoring, based on the checkpoint file, a state of the respective process at the time of the crash such that the new process initiates execution from the restored state.

2. The method of claim 1, wherein the information related to the one or more processes in the checkpoint file further includes contents of memory pages assigned to the one or more processes, wherein restoring the state of the respective process further comprises setting contents of memory pages of the new process to be equal to contents of memory pages assigned to the respective process at the time of the crash.

3. The method of claim 1, wherein the information related to the one or more processes in the checkpoint file further includes references to I/O resources used by the one or more processes, wherein restoring the state of the respective process further comprises providing, to the new process, access to I/O resources used by the respective process on the computing device at the time of the crash.

4. The method of claim 1, wherein the information related to the one or more processes in the checkpoint file further includes inter-process relationships between a process and any of the one or more processes running on the OS, wherein restoring the state of the respective process further comprises establishing, for the new process and one or more new processes, an inter-process relationship of the respective process on the computing device at the time of the crash.

5. The method of claim 1, wherein the information related to the one or more processes in the checkpoint file further includes at least one kernel structure related to the one or more processes, wherein restoring the state of the process further comprises creation of similar kernel structures for corresponding new processes.

6. The method of claim 1, wherein the one or more processes are comprised in a container and depend on each other, and wherein restoration of the one or more processes enables the container to execute on the computing device or the another computing device starting from a point when the crash occurred.

7. The method of claim 1, wherein the computing device and the another computing device are members of a cluster of computing devices, further comprising:
　　determining whether the one or more processes are to be restored on the computing device or the another computing device; and
　　in response to determining that the one or more processes are to be restored on the computing device, creating the new process subsequent to a reboot of the computing device.

8. The method of claim 7, wherein a determination of whether the one or more processes are to be restored on the computing device or the another computing device is made prior to generating the checkpoint file, further comprising:
　　in response to determining that the one or more processes are to be restored on the another computing device, retrieving a crash dump file of the OS;
　　generating the checkpoint file by extracting the information from the crash dump file; and
　　transmitting the checkpoint file to a storage device shared by the computing device and the another computing device.

9. The method of claim 7, wherein determining whether the one or more processes are to be restored on the computing device or the another computing device is based on loads of the computing device and at least the another computing device in the cluster.

10. The method of claim 1, wherein restoration of a first subset of the one or more processes is prioritized over a second subset of the one or more processes, wherein the first subset includes processes tagged as critical.

11. A system for restoring a process, the system comprising:
one or more computing devices, wherein each computing device comprises a hardware processor, and wherein the one or more computing devices are configured to:
detect a crash of an operating system (OS) on a computing device, wherein upon crash detection one or more processes running on the OS are prevented from proceeding execution;
collect, from an OS crash dump on a subsequent boot, a memory state of at least one page of physical memory of the OS on the computing device;
generate, without using information from a currently running OS kernel, a checkpoint file that includes information related to the one or more processes from the collected memory state, wherein the information comprises a state for each of the one or more processes at a time of the crash;
for each respective process of the one or more processes,
create, on the computing device or another computing device, a new process corresponding to the respective process; and
restore, based on the checkpoint file, a state of the respective process at the time of the crash such that the new process initiates execution from the restored state.

12. The system of claim 11, wherein the information related to the one or more processes in the checkpoint file further includes contents of memory pages assigned to the one or more processes, wherein restoring the state of the respective process further comprises setting contents of memory pages of the new process to be equal to contents of memory pages assigned to the respective process at the time of the crash.

13. The system of claim 11, wherein the information related to the one or more processes in the checkpoint file further includes references to I/O resources used by the one or more processes, wherein restoring the state of the respective process further comprises providing, to the new process, access to I/O resources used by the respective process on the computing device at the time of the crash.

14. The system of claim 11, wherein the information related to the one or more processes in the checkpoint file further includes inter-process relationships between a process and any of the one or more processes running on the OS, wherein restoring the state of the respective process further comprises establishing, for the new process and one or more new processes, an inter-process relationship of the respective process on the computing device at the time of the crash.

15. The system of claim 11, wherein the information related to the one or more processes in the checkpoint file further includes at least one kernel structure related to the one or more processes, wherein restoring the state of the process further comprises creation of similar kernel structures for corresponding new processes.

16. The system of claim 11, wherein the one or more processes are comprised in a container and depend on each other, and wherein restoration of the one or more processes enables the container to execute on the computing device or the another computing device starting from a point when the crash occurred.

17. The system of claim 11, wherein the computing device and the another computing device are members of a cluster of computing devices, and wherein the hardware processor is further configured to:
determine whether the one or more processes are to be restored on the computing device or the another computing device; and
in response to determining that the one or more processes are to be restored on the computing device, create the new process subsequent to a reboot of the computing device.

18. The system of claim 17, wherein a determination of whether the one or more processes are to be restored on the computing device or the another computing device is made prior to generating the checkpoint file, and wherein the hardware processor is further configured to:
in response to determining that the one or more processes are to be restored on the another computing device, retrieve a crash dump file of the OS;
generate the checkpoint file by extracting the information from the crash dump file; and
transmit the checkpoint file to a storage device shared by the computing device and the another computing device.

19. The system of claim 17, wherein determining whether the one or more processes are to be restored on the computing device or the another computing device is based on loads of the computing device and at least the another computing device in the cluster.

20. A non-transitory computer-readable medium storing thereon computer executable instructions for restoring a process, including instructions for:
detecting a crash of an operating system (OS) on a computing device, wherein upon crash detection one or more processes running on the OS are prevented from proceeding execution;
collecting, from an OS crash dump on a subsequent boot, a memory state of at least one page of physical memory of the OS on the computing device;
generating, without using information from a currently running OS kernel, a checkpoint file that includes information related to the one or more processes from the collected memory state, wherein the information comprises a state for each of the one or more processes at a time of the crash;
for each respective process of the one or more processes,
creating, on the computing device or another computing device, a new process corresponding to the respective process; and
restoring, based on the checkpoint file, a state of the respective process at the time of the crash such that the new process initiates execution from the restored state.

* * * * *